United States Patent
Jeong

(10) Patent No.: US 10,903,732 B2
(45) Date of Patent: Jan. 26, 2021

(54) MOVEABLE CORE-TYPE RECIPROCATING MOTOR AND RECIPROCATING COMPRESSOR HAVING A MOVEABLE CORE-TYPE RECIPROCATING MOTOR

(71) Applicant: LG ELECTRONICS INC., Seoul (KR)

(72) Inventor: Sangsub Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 15/866,637

(22) Filed: Jan. 10, 2018

(65) Prior Publication Data

US 2018/0198358 A1 Jul. 12, 2018

(30) Foreign Application Priority Data

Jan. 12, 2017 (KR) .......................... 10-2017-0005414

(51) Int. Cl.
| | |
|---|---|
| H02K 33/02 | (2006.01) |
| F04B 53/12 | (2006.01) |
| H02K 1/02 | (2006.01) |
| F04B 53/16 | (2006.01) |
| H02K 1/14 | (2006.01) |
| F04B 39/00 | (2006.01) |

(Continued)

(52) U.S. Cl.
CPC ............. *H02K 33/02* (2013.01); *F04B 35/04* (2013.01); *F04B 35/045* (2013.01); *F04B 39/0016* (2013.01); *F04B 39/0292* (2013.01); *F04B 39/121* (2013.01); *F04B 39/125* (2013.01); *F04B 53/125* (2013.01); *F04B 53/16* (2013.01); *H02K 1/02* (2013.01); *H02K 1/14* (2013.01); *H02K 1/141* (2013.01); *H02K 1/182* (2013.01); *H02K 1/34* (2013.01); *H02K 33/16* (2013.01); *H02K 2213/03* (2013.01)

(58) Field of Classification Search
CPC ........ H02K 33/02; F04B 35/04; F04B 35/045
USPC .......................................... 310/15
See application file for complete search history.

(56) References Cited

U.S. PATENT DOCUMENTS

| | | | |
|---|---|---|---|
| 2004/0061583 | A1 | 4/2004 | Yumita |
| 2005/0057101 | A1* | 3/2005 | Nakagawa ............ H01F 7/1615 310/12.24 |

(Continued)

FOREIGN PATENT DOCUMENTS

| | | |
|---|---|---|
| DE | 10 2011 003 792 | 8/2012 |
| EP | 1 912 319 | 4/2008 |

(Continued)

OTHER PUBLICATIONS

International search Report dated Apr. 19, 2018.
European Search Report dated Jun. 4, 2018.

*Primary Examiner* — Terrance L Kenerly
(74) *Attorney, Agent, or Firm* — Fish & Richardson P.C.

(57) ABSTRACT

A movable core-type reciprocating motor and a reciprocating compressor having a movable core-type reciprocating motor are provided. The motor may include a stator including an inner stator and an outer stator; a magnet coil wound between the inner stator and the outer stator; a magnet fixed to at least one of the inner stator or the outer stator so as to be at least partially positioned within a range of the air gap; and a mover including a movable core disposed in the air gap and made of a magnetic material to perform a reciprocation movement with respect to the stator.

20 Claims, 9 Drawing Sheets

(51) Int. Cl.
  *H02K 1/34*    (2006.01)
  *H02K 1/18*    (2006.01)
  *F04B 35/04*   (2006.01)
  *F04B 39/12*   (2006.01)
  *F04B 39/02*   (2006.01)
  *H02K 33/16*   (2006.01)

(56) References Cited

U.S. PATENT DOCUMENTS

2013/0058811 A1    3/2013  Hong
2015/0004030 A1*   1/2015  Jeong ................... H02K 33/16
                                                          417/420

FOREIGN PATENT DOCUMENTS

| JP | 11-187638      | 7/1999  |
| JP | 11-341778      | 12/1999 |
| JP | 2000-083364    | 3/2000  |
| JP | 2003-250256    | 9/2003  |
| JP | 2008-154303    | 7/2008  |
| KR | 10-2004-03088472 | 10/2004 |
| KR | 10-0492612     | 5/2005  |
| KR | 10-0539813     | 1/2006  |
| KR | 10-2014-0110625 | 9/2014  |
| WO | WO 2006/025617 | 3/2006  |

\* cited by examiner

MOVEABLE CORE-TYPE RECIPROCATING MOTOR AND RECIPROCATING COMPRESSOR HAVING A MOVEABLE CORE-TYPE RECIPROCATING MOTOR

CROSS-REFERENCE TO RELATED APPLICATION(S)

Pursuant to 35 U.S.C. § 119(a), this application claims the benefit of earlier filing date and right of priority to Korean Application No. 10-2017-0005414, filed on Jan. 12, 2017, the contents of which is incorporated by reference herein in its entirety.

BACKGROUND

1. Field

A movable core-type reciprocating motor and a reciprocating compressor having a moveable core-type reciprocating motor are disclosed herein.

2. Background

A motor is a device that converts electrical energy into mechanical energy and obtains rotational or reciprocating force. Such a motor may be classified into an AC motor and a DC motor depending on a power applied.

The motor includes a stator and a mover or a rotor. The mover having a magnet is rotated or reciprocated according to a direction of a flux generated when a current flows in a coil provided in the stator.

The motor may be classified into a rotating motor or a reciprocating motor depending on a movement mode of the mover. In the rotating motor, a flux is formed in the stator by the power applied to the magnet coil and the mover rotates with respect to the stator by this flux, but in the reciprocating motor, the mover reciprocates linearly with respect to the stator.

The reciprocating motor, which usually modifies the flux of a motor having a three-dimensional structure into a plate shape, is a kind of motor that linearly moves according to a change in the magnetic field of a planar stator, where a planar mover is also placed on top of the planar stator.

Recently, a stator is formed into a cylindrical shape having an inner stator and an outer stator. A magnet coil for generating an induction magnetic field is wound on either the inner stator or the outer stator and magnets are arranged in a mover, with magnet poles arranged along an axial direction of the stator. Thus, a reciprocating motor for a compressor is being introduced that allows the mover to reciprocate in an air gap between the inner stator and the outer stator.

Such reciprocating motors for compressors are disclosed in Korean Patent No. 10-0492612 (hereinafter, referred to as "prior art 1") and Korean Patent No. 10-0539813 (hereinafter, referred to as "prior art 2"), which are hereby incorporated by reference. In the prior art 1 and the prior art 2, a plurality of iron cores formed of thin plates is radially laminated on a magnet coil formed in an annular shape to form a cylindrical outer stator or inner stator.

The reciprocating motor is provided with mechanical resonance springs made of compression coil springs on both sides of the mover in order to stably reciprocate the mover. Accordingly, when the mover moves in a forward and backward direction along a flux direction of the power source applied to the magnet coil, the mechanical resonance spring provided in a moving direction of the mover is compressed, and then, when the mover moves in an opposite direction, the mechanical resonance spring, which accumulates a repulsive force, repeats the process of pushing out the mover.

However, in the conventional reciprocating motor, the mover is supported by a mechanical resonance spring formed of a compression coil spring, but as the compression coil spring has its own resonance, there is a problem in that a certain section may not be used as an operation frequency even within an operation frequency of a certain section.

Further, in the conventional reciprocating motor, as a mechanical resonance spring made of a compression coil spring is installed, a mechanical stress limitation and a restriction, such as a vibration distance, occur due to characteristics of the compression coil spring. As a result, as the resonance spring must secure a certain diameter and length, there was a limitation in reducing a transverse length of the reciprocating motor.

Furthermore, in the conventional reciprocating motor, as a mechanical resonance spring made of a compression coil spring is installed, as a spring support member for fixing both ends of the compression coil spring must be provided in the mover and the stator, respectively. Therefore, a mechanism structure of the motor becomes complicated and a plurality of resonance springs must be installed at both sides of a front and rear of the mover, so that there is a problem that the assembling process becomes difficult.

In addition, in the conventional reciprocating motor, as the mover including the magnet between the outer stator and the inner stator is arranged to be reciprocatable, air gaps are formed on outer and inner sides of the mover, respectively, so that a total air gap is increased to lower motor efficiency. Also, in the conventional reciprocating motor, as a magnet and the magnet frame supporting the magnet have a large thickness, a weight of the entire mover increases, and this increases power consumption and also increases the air gap between the outer and inner stators. As a result, there is a problem that the motor efficiency is lowered further.

In addition, the reciprocating compressor using the reciprocating motor as described above still has a problem in the reciprocating motor described above, and thus, has a limitation in miniaturizing the reciprocating compressor.

BRIEF DESCRIPTION OF THE DRAWINGS

Embodiments will be described in detail with reference to the following drawings in which like reference numerals refer to like elements, and wherein.

DETAILED DESCRIPTION

Hereinafter, embodiments will be described with reference to the drawings. However, embodiments are not limited to the embodiments shown below, and those skilled in the art may easily realize other embodiments included in the scope by adding, modifying, deleting, adding, and the like, elements included in the scope and understand that they are also included within the scope.

In relation to the drawings attached to the following embodiments, in order to facilitate understanding within the scope that the ideas of are not undermined even in the embodiments of the same ideas of, different drawings may be expressed for each drawing in the representation of a minute portion, and a specific portion may not be displayed or may be exaggerated according to the drawings.

Figure 1:
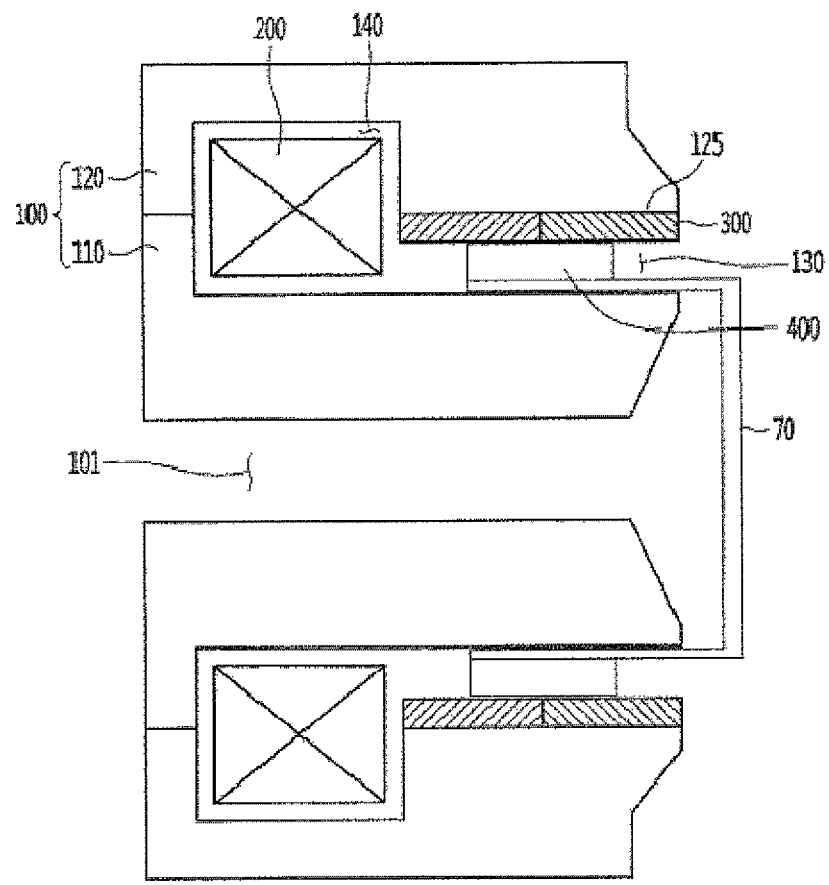
FIG. 1 is a schematic cross-sectional view of a movable core-type reciprocating motor according to an embodiment.
Figure 2:
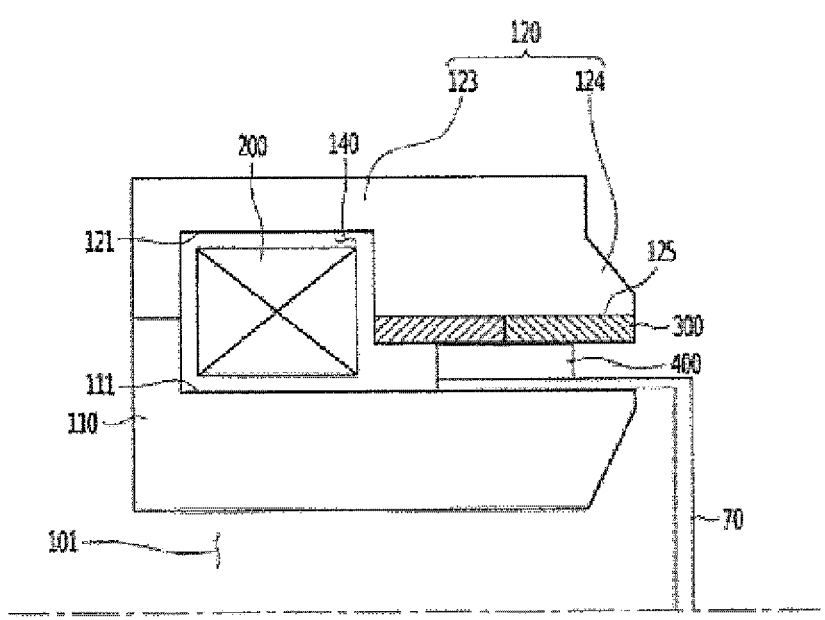
FIG. 2 is a cross-sectional view taken from a part of a stator and a mover, which are components of embodiments.

FIG. 1 is a cross-sectional view schematically illustrating a movable core-type reciprocating motor according to an embodiment. FIG. 2 is a cross-sectional view of a portion of a stator and a mover of FIG. 1.

Referring to FIGS. 1 and 2, a movable core-type reciprocating motor according to an embodiment may include a stator 100, a magnet coil 200, a magnet 300, and a mover 400. Hereinafter, the mover 400 refers to a movable core coupled to a connection part or portion 70 described below and located within a range of an air gap 130. The stator 100 may include an inner stator 110 and an outer stator 120 having one or a first side connected to the inner stator 110 and the other or a second side spaced at an outer side in a radial direction of the inner stator 110 to form an air gap 130 with the other side of the inner stator 110.

The inner stator 110 and the outer stator 120 constituting the stator 100 may be made of a magnetic material or a conductive material, for example. In addition, the inner stator 110 according to this embodiment radially laminates a single piece of core, and the outer stator 120 radially laminates a core block with the laminated core on an outer circumferential surface of the inner stator 110. The inner stator 110 and the outer stator 120 may contact only at one or a first end in the axial direction, and may be spaced apart from the other or a second end to form one air gap.

The magnet coil 200 may be wound between the inner stator 110 and the outer stator 120, or may be accommodated in a wound state. In this embodiment, the magnet coil 200 may be connected to the inner stator 110 while being wound on the inner stator 110 and may be separately wound and then fixed between the inner stator 110 and the outer stator 120.

In the former case, after the magnet coil 200 is wound on the inner stator 110, the outer stator 120 may be fixed to the inner stator 110. On the other hand, in the latter case, the inner stator 110 may be formed by radially laminating a plurality of inner core blocks on an inner circumferential surface of the wound magnet coil 200, and the outer stator 120 may also be formed by radially laminating a plurality of outer core blocks on an outer circumferential surface of the magnet coil 200 in a wound state. The inner stator 110 may form a hollow 101 by the radially laminated inner core block, and the hollow 101 may be used as a space later in which the piston and the cylinder are disposed.

As another example, the inner core block and the outer core block may be integrally formed in a '⊏' shape, and then inserted into the magnet coil 200 to be laminated. In addition, the outer core block may be radially laminated on the outer circumferential surface of the magnet coil 200 after radially laminating the inner core block 110*a* on the inner circumferential surface of the magnet coil 200. In the latter case, an operation of integrally connecting one side of the inner core block and one side of the outer core block while disposing the outer core block on the outer circumferential surface of the magnet coil 200 may be performed at the same time.

Referring to FIG. 2 again, the magnet coil 200 may be accommodated between the inner stator 110 and the outer stator 120 and the space 140 that communicates with the air gap 130 may be formed eccentrically to an opposite side of the mover 400 (that is, movable core) from a center of the stator 110. In addition, the winding grooves 111 and 121 may be formed on at least one of the inner stator 110 or the outer stator 120 to be concave toward the inner surface, thereby forming the space 140 on the facing surface.

A size of the space 140 or the winding grooves 111 and 121 may be formed in proportion to an amount of the wound magnet coil 200. For example, as shown in FIGS. 1 to 4, the winding grooves 111 and 121 may be formed on both sides of the inner stator 110 and the outer stator 120.

Figure 5:
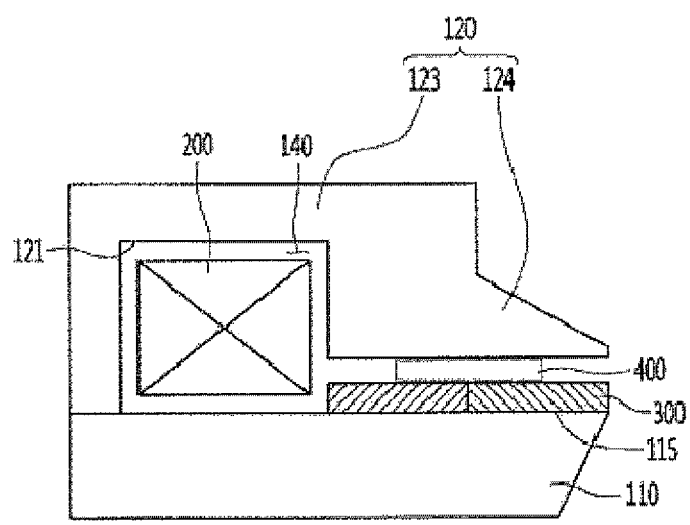
FIG. 5 is a schematic cross-sectional view of a movable core-type reciprocating motor according to another embodiment.

As another example, as shown in FIG. 5, no winding groove is formed in the inner stator 110, and the winding groove 121 may be formed only in the outer stator 120. Although not shown in the drawing, as another example, a winding groove may not be formed in the outer stator 120, and a winding groove may be formed only in the inner stator 110.

When the winding grooves 111 and 121 are formed as described above, the space 140 for accommodating the magnet coil 200 is provided, so that connection between the magnet coil 200 and the inner and outer stators 110 and 120 may be facilitated. By the winding groove 121, a yoke part or yoke 123 having a relatively thin thickness compared to a pole part or pole 124 to which the magnet 300 is fixed may be formed at the inner stator 110 and the outer stator 120.

As described above, in at least one of the inner stator 110 or the outer stator 120, the yoke part 123 forming a magnetic path and the pole part 124 extending wider than a width of the yoke part 123 and having the magnet 300 fixed may be formed. The pole part 124 may be equal to or slightly longer than a length of the fixed magnet 300.

By a combination of the yoke part 123 and the pole part 124 as described above, a stiffness of a magnetic spring, an alpha value (a thrust constant of the motor), and a change rate of the alpha value may be defined, and the yoke part 123 and the pole part 124 may have a length or form defined in a variety of ranges depending on a design of a product to which the reciprocating motor is applied.

On the other hand, as described above, the magnet 300 may be fixed to at least one of the outer circumferential surface of the inner stator 110 laminated on each of the inner circumferential surface and the outer circumferential surface of the magnet coil 200 in a cylindrical shape, or the inner circumferential surfaces of the outer stator 120.

The magnet 300 may be spaced apart from the magnet coil 200 in a reciprocating direction (axial direction) of a mover (precisely moveable core), which is described hereinafter.

That is, the magnet 300 and the magnet coil 200 may be arranged so as not to overlap each other in the radial direction of the stator 100.

In the conventional case, the magnet 300 and the magnet coil 200 have to overlap in the radial direction of the stator 100, and a diameter of the motor has to be increased accordingly. On the other hand, according to embodiments, as the magnet 300 and the magnet coil 200 are spaced apart from each other in the reciprocating direction of the mover 400, the diameter of the motor may be reduced compared to the related art.

In addition, the magnet 300 may be formed such that different magnet poles are arranged in the reciprocating direction of the mover 400. For example, the magnet 300 may be a 2-pole magnet having the N pole and the S pole with a same length on both sides.

In addition, in relation to the magnet 300, at least a part or portion of a cross section in the axial direction may have an arc shape. For example, the magnet 300 may be cylindrical.

As another example, when viewed in the axial direction, the magnet 300 may have an arc-shaped cross section, and when provided in plurality, may be spaced apart from each other along the circumferential direction of the outer circumferential surface of the inner stator 110 or the inner circumferential surface of the outer stator 120.

The magnet 300 may be exposed to the air gap 130. For this, magnet fixing surfaces 115 and 125 where the magnet 300 is fixed may be formed on facing surfaces of the inner stator 110 and the outer stator 120 that form the air gap 130. The magnet fixing surfaces 115 and 125 may be formed corresponding to a shape of the inner surface or the outer surface of the magnet 300. For example, in a case that the magnet 300 is fixed to the outer stator 120, when the outer surface of the magnet 300 is curved, the magnet fixing surface 125 of the outer stator 120 may also be formed as a curved surface, and when the outer surface of the magnet 300 is flat, the magnet fixing surface 125 of the outer stator 120 may also be formed as a flat surface.

As another example, in a case that the magnet 300 is fixed to the inner stator 110, when the inner surface of the magnet 300 is curved, the magnet fixing surface 115 of the inner stator 110 may also be formed as a curved surface, and when the inner surface of the magnet 300 is flat, the magnet fixing surface 115 of the inner stator 110 may also be formed as a flat surface.

For reference, when the outer or inner surface of the magnet 300 is a curved surface, the outer circumferential surface of the inner stator 110 or the inner circumferential surface of the outer stator 120 may be circular. In addition, when the outer surface or the inner surface of the magnet 300 is flat, the outer surface of the inner stator 110 or the inner surface of the outer stator 120 may have a polygonal shape.

As shown in FIGS. 1 to 4, the magnet 300 may be fixed to the outer stator 120. In addition, as shown in FIG. 5, the magnet 300 may be fixed to the inner stator 110. Although not shown in the drawing, as another example, the magnet 300 may be fixed to both the inner stator 110 and the outer stator 120.

The mover 400 may be disposed in the air gap 130 where the magnet 300 is exposed and may be made of a magnetic material and perform a reciprocation movement with respect to the stator 100 and the magnet 300. The mover 400 may be spaced apart from the magnet coil 200 in the reciprocating direction of the mover 400, so that the gap between the magnet coil 200 and the mover 400 may vary according to the reciprocation movement of the mover 400. That is, the mover 400 and the magnet coil 200 may be arranged so as not to overlap each other in the radial direction of the stator 100.

In the conventional case, the mover 400 and the magnet coil 200 have to overlap in the radial direction of the stator 100, and the diameter of the motor has to be increased accordingly. On the other hand, according to embodiments, as the mover 400 and the magnet coil 200 are spaced apart from each other in the reciprocating direction of the mover 400, the diameter of the motor may be reduced compared to the related art.

In this embodiment, in relation to the mover 400, at least a part or portion of a cross section in the axial direction may have an arc shape. That is, the mover 400 may be formed to have a hollow cylindrical shape to be inserted into the cylindrical air gap 130 formed between the cylindrical inner stator 110 and outer stator 120, or when viewed in the axial direction, may be provided in plurality and may be spaced apart from each other in the circumferential direction.

The mover 400 may be supported by the connection part 70. For example, the connection part 70 may be formed in a cylindrical shape so as to be connected to the inner circumferential surface of the cylindrical mover 400.

As another example, a plurality of movers 400 having arc-shaped cross-sections may take a connection structure spaced along the circumference of the connection part 70. The mover 400 may be inserted with an interval between the outer surface of the inner stator 110 or the outer stator 120 exposed to the air gap 130 and the magnet 300, and for this, a size of the mover 400 should be smaller than a size of the air gap 130.

That is, the inner circumferential surface of the mover 400 may be formed to have a larger diameter than the outer circumferential surface of the inner stator 110, and the outer circumferential surface of the mover 400 may be formed to have a smaller diameter than the inner circumferential surface of the outer stator 120.

The reciprocating motor according to this embodiment may perform a reciprocation movement by a reciprocating direction centering force generated between the stator 100 having the magnet coil 200, the magnet 300, and the mover 400. The reciprocating direction centering force may refer to a force that the magnetic energy (magnetic potential energy, magnetic resistance) is stored toward a low side when the mover 400 moves within the magnetic field, and this force forms a magnetic spring. Therefore, in this embodiment, when the mover 400 performs a reciprocation movement by the magnetic force of the magnet coil 200 and the magnet 300, the mover 400 accumulates a force to return in a center direction by a magnetic spring, and this force accumulated in this magnetic spring causes the mover 400 to resonate and continue to make a reciprocation movement.

Hereinafter, an operation principle of the movable core-type reciprocating motor according to this embodiment will be described.

First, an alternating flux is formed between the inner stator 110 and the outer stator 120 when an AC current is applied to the magnet coil 200 of the reciprocating motor. In this case, the mover 400 moves in both directions along a flux direction and continuously performs a reciprocation movement. Inside the reciprocating motor, a magnetic spring is formed between the mover 400 and the stator 100 and the magnet 300, thereby inducing a resonance motion of the mover 400.

Figure 3:
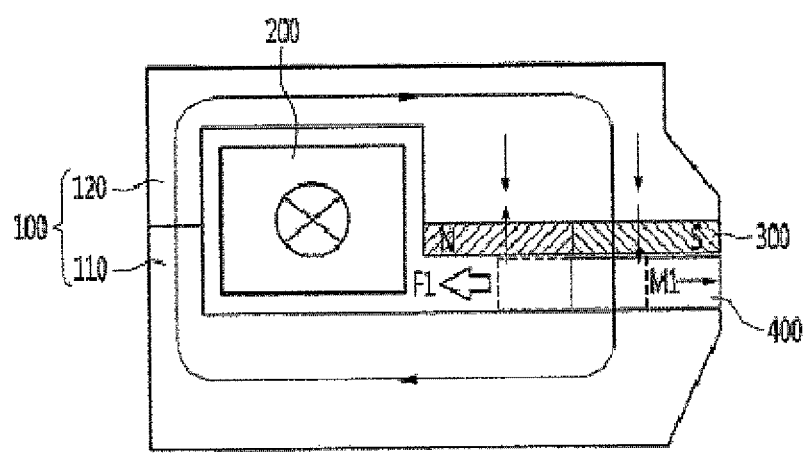
FIGS. 3 and 4 are schematic views for explaining operation of a movable core-type reciprocating motor according to an embodiment.
Figure 4:
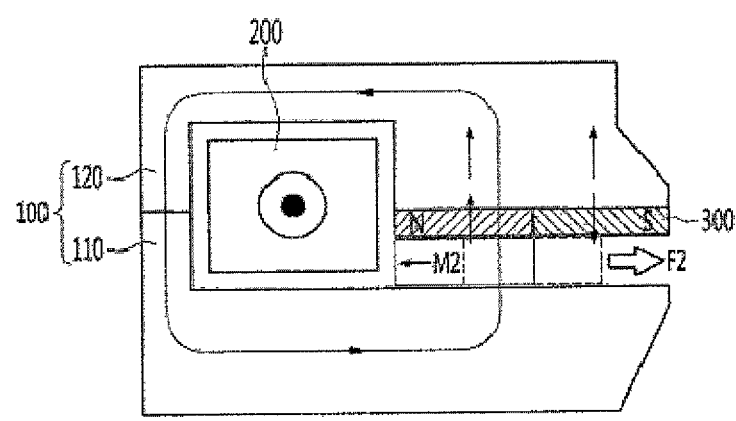

FIGS. 3 and 4 are schematic views for explaining operation of a movable core-type reciprocating motor according to an embodiment. For example, as shown in FIG. 3, in the state that the magnet 300 is fixed to the outer stator 120 and the flux by the magnet 300 flows in a clockwise direction in the drawing, when an AC current is applied to the magnet coil 200, the flux caused by the magnet coil 200 flows clockwise in the drawing, and the mover 400 moves in a rightward direction of the drawing (see arrow M1) where the flux by the magnet coil 200 and the flux by the magnet 300 are increased.

Between the mover 400 and the stator 100 and the magnet 300, a reciprocating centering force F1 to restore in a leftward direction of the drawing where magnetic energy (that is, magnetic potential energy or magnetic resistance) is low is accumulated. In this state, as shown in FIG. 4, when the direction of the current applied to the magnet coil 200 is changed, the flux by the magnet coil 200 flows counterclockwise in the drawing, and the flux by the magnet coil 200 and the flux by the magnet 300 are increased in the opposite direction to the previous direction, that is, leftward in the drawing.

The mover 400 is moved in the left direction of the drawing (see the arrow M2) by the accumulated reciprocating centering force F1 and the magnetic force of the fluxes of the magnet coil 200 and the magnet 300. In this process, the mover 400 is further moved to the left in the drawing through a center of the magnet 300 by an inertial force and magnetic force.

In the same manner, between the mover 400 and the stator 100 and the magnet 300, a reciprocating centering force F2 to restore in the center direction of the magnet 300 where the magnetic energy is low, that is, the rightward direction of the drawing, is accumulated. Again, as shown in FIG. 3, when the direction of the current applied to the magnet coil 200 is changed, by the accumulated reciprocating centering force F2 and the magnetic force due to the fluxes of the magnet coil 200 and the magnet 300, the mover 400 moves toward the direction of the center of the magnet 300. At this time, too, the mover 400 moves further to the rightward direction in the drawing through the center of the magnet 300 due to the inertia force and the magnetic force, and the reciprocating centering force F1 to return toward the center direction of the magnet 300 where magnetic energy is low, that is, the leftward direction of the drawing, is accumulated between the mover 400 and the stator 100 and the magnet 300. In this way, the mover 400 continuously repeats a reciprocation movement that alternately moves between the right and left sides of the drawing, such as in a mechanical resonance spring.

Hereinafter, although not shown in the drawing, a resonance movement of the mover 400 will be described in the case that the magnet 300 is fixed to the inner stator 110.

In the state that the magnet 300 is fixed to the inner stator 110 and the flux by the magnet 300 flows in the counterclockwise direction, when an AC current is applied to the magnet coil 200 and the flux caused by the magnet coil 200 flows clockwise, the mover 400 moves in the leftward direction of the drawing where the flux by the magnet coil 200 and the flux by the magnet 300 are increased. The reciprocating centering force is accumulated in the rightward direction.

In this state, when the direction of the current applied to the magnet coil 200 is changed, the flux by the magnet coil 200 flows counterclockwise, and the mover 400 moves in the rightward direction of the drawing where the flux by the magnet coil 200 and the flux by the magnet 300 are increased. The mover 400 is moved in the center direction of the magnet 300 by the reciprocating centering force F1 accumulated in the rightward direction and the magnetic force by the fluxes of the magnet coil 200 and the magnet 300.

In this process, the mover 400 is further moved in the rightward direction of the drawing through the center of the magnet 300 by the inertial force and the magnetic force. In the same manner, a reciprocating centering force to return to the leftward direction may be accumulated between the mover 400 and the stator 100 and the magnet 300, and in this way, even when the magnet 300 is fixed to the inner stator 110, the mover 400 continuously repeats a reciprocation movement that alternately moves between the right and left sides of the drawing, as in a mechanical resonance spring.

Figure 6:
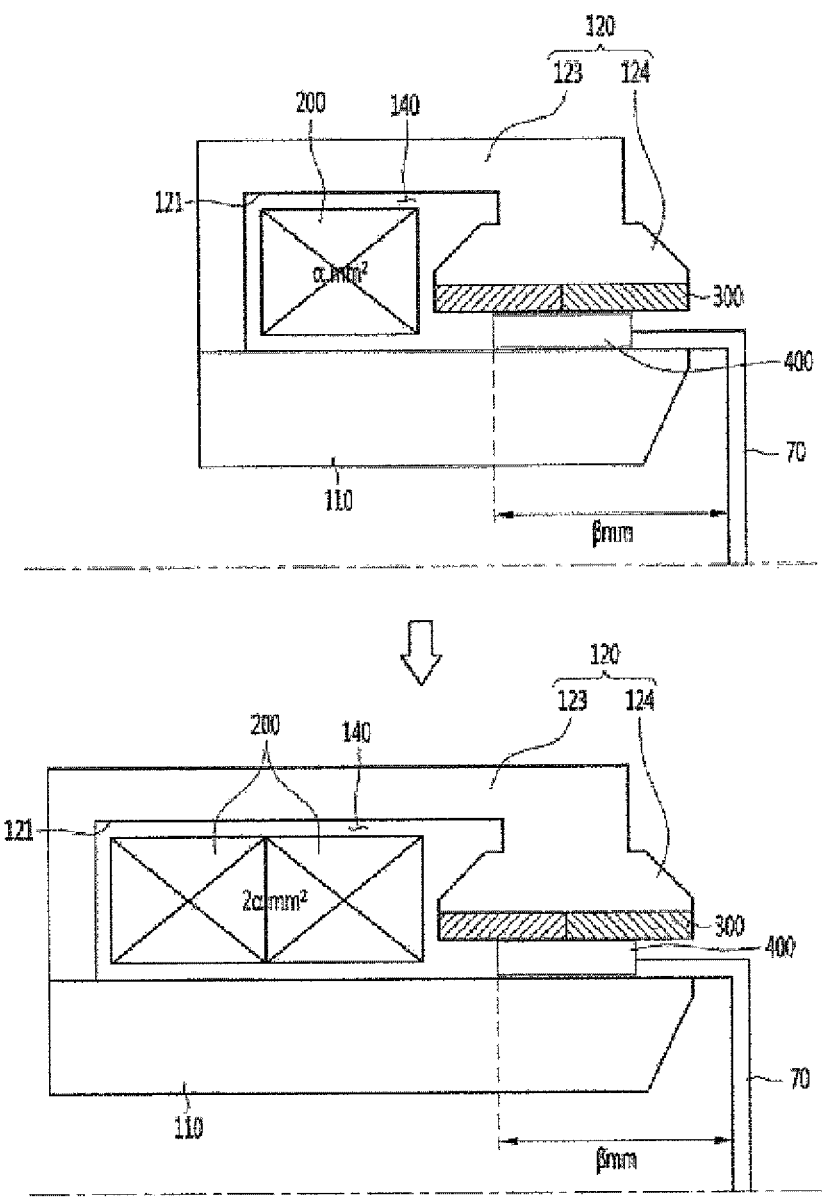
FIG. 6 is a schematic view for explaining a length change of a movable core-type reciprocating motor according to an embodiment.

FIG. 6 is a schematic view for explaining a length change of a movable core-type reciprocating motor according to an embodiment. In the conventional case, to increase output of the reciprocating motor, an amount of winding of the magnet coil 200 was inevitably increased and a length of the stator 100 and the mover 400 was inevitably increased. Accordingly, a length of the magnet was increased by the length of the longer mover 400, and as a result, the weight of the mover 400 was increased, which makes it difficult to maintain motor efficiency.

However, in the case of embodiments disclosed herein, as shown in FIG. 6, even when the amount of winding of the magnet coil 200 is increased to increase the output of the motor, only the length of the stator 100 and the magnet 300 may be increased, and the length of the mover 400 may be maintained constant. Accordingly, the weight of the mover 400 may be maintained constant, and the motor efficiency may be improved compared to the conventional motor.

Figure 7:
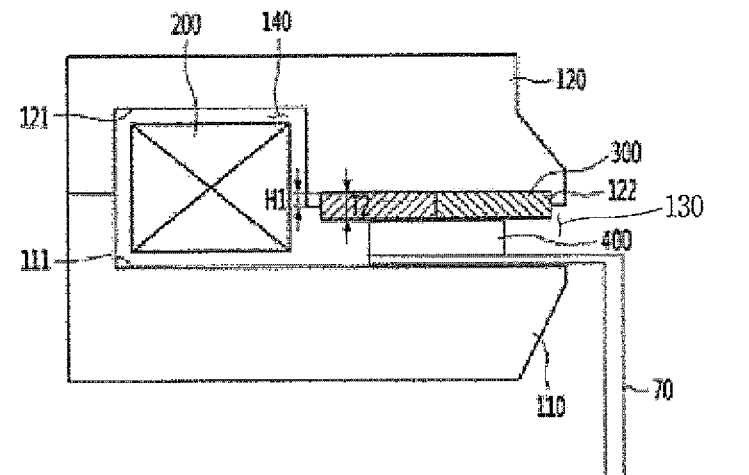
FIG. 7 is a cross-sectional view schematically showing a movable core-type reciprocating motor according to another embodiment.

FIG. 7 is a cross-sectional view schematically showing a movable core-type reciprocating motor according to another embodiment. Referring to FIG. 7, stator 100 may form a reception groove 122 inwardly concave at an end where air gap 130 is formed, and the magnet 300 may be received in the reception groove 122.

That is, the magnet 300 may be fixed in a filling type without protruding to the outer side of the stator 100. In this case, as the magnet 300 is exposed to the air gap 130 in a state in which the magnet 300 is filled in the stator 100, a magnetic force may be applied to the mover 400 disposed in the air gap 130, and the coupling force with the stator 100 may be further increased.

Accordingly, it is possible to prevent the magnet 300 from interfering with the reciprocation movement of the mover 400 during the reciprocation movement of the mover 400, and it is possible to prevent the magnet 300 from moving along the flux direction by the flux. Moreover, the magnet 300 may be maintained fixed to the stator 100 without being separated from the stator 100 even when an external force is generated.

Although not shown in the drawing, as another example, a reception groove may be formed in the inner stator 110, and the magnet 300 may be received in the reception groove formed in the inner stator 110. Further, although not shown in the drawing, as another example, the reception groove 122 formed in the stator 100 may further have groove parts or grooves formed on both sides at the inside and the magnet 300 may have protrusions inserted into the groove parts on both sides to firmly fix the stator 100 and the magnet 300 to each other.

In this embodiment, a height H1 of the reception groove 122 is smaller than a thickness T2 of the magnet 300 received in the reception groove 122, so that a part or portion of the magnet 300 may protrude to the outside of the reception groove 122. In some cases, when the entire magnet 300 is received in the reception groove 122, an abnormality may occur in the flux of the magnet 300. In order to prevent this phenomenon, only a part or portion of the magnet 300 may be accommodated in the reception groove 122 to secure the coupling force, and the remaining part or portion may protrude toward the outside of the reception groove 122 to secure flux.

Figure 8:
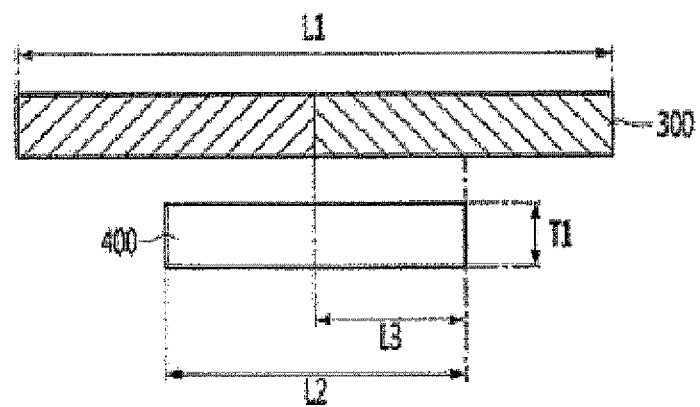
FIG. 8 is a schematic view for explaining a magnet and a mover, which are components of embodiments.

FIG. 8 is a schematic view for explaining a magnet and a mover, which are components of embodiments. Hereinafter, with reference to FIG. 8, in order to increase efficiency of the reciprocating motor according to embodiments, a design method of a length of the mover 400 and a thickness of the mover 400 will be described.

First, a length L1 of the magnet applied to embodiments may be at least two times a maximum stroke of the mover 400. The reason why the length L1 of the magnet is limited in this way is taking into consideration variation in stiffness of the motor spring. Therefore, it is necessary to form the length L1 of the magnet longer than the maximum stroke of the mover 400.

For example, when the maximum stroke of the mover 400 is 11 mm, the length L1 of the magnet may be designed to be about 1 mm greater in consideration of an inflection of the stiffness of the motor spring so that a length of a 1-pole magnet is 12 mm and a length of a 2-pole magnet is 24 mm. Also, the length L2 of the mover (that is, the movable core) applied to embodiments may be formed to be equal to or larger than half of the length L1 of the magnet.

As described above, the reason for limiting the length L2 of the mover (that is, the movable core) is to secure linearity and an operation range of the motor spring rigidity. Therefore, the length L2 of the mover (that is, the movable core) should be more than half of the length L1 of the magnet.

It is necessary to prevent excessive increase in weight of the mover in order to secure the efficiency of the motor. Therefore, the length L2 of the mover (that is, the movable core) may not be longer than the length L1 of the magnet.

Also, when the magnet 300 and the mover 400 are centered, that is, when a center of the magnet and a center of the movable core coincide with each other, the thickness T1 of the movable core may be less than half of a length L3 that one magnet pole of the magnet 300 and the mover 400 (that is, the movable core) overlap.

Figure 9:
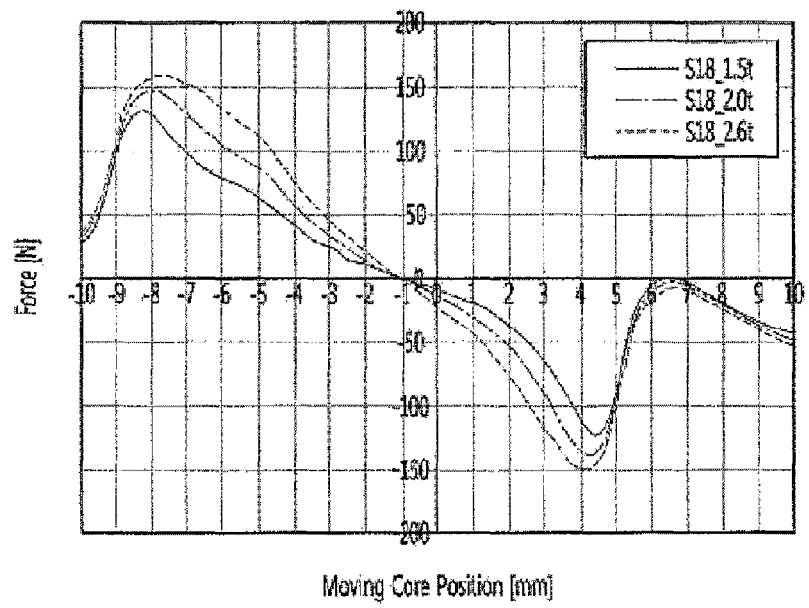
FIG. 9 is a graph showing an output change according to thickness of a mover.
Figure 10:
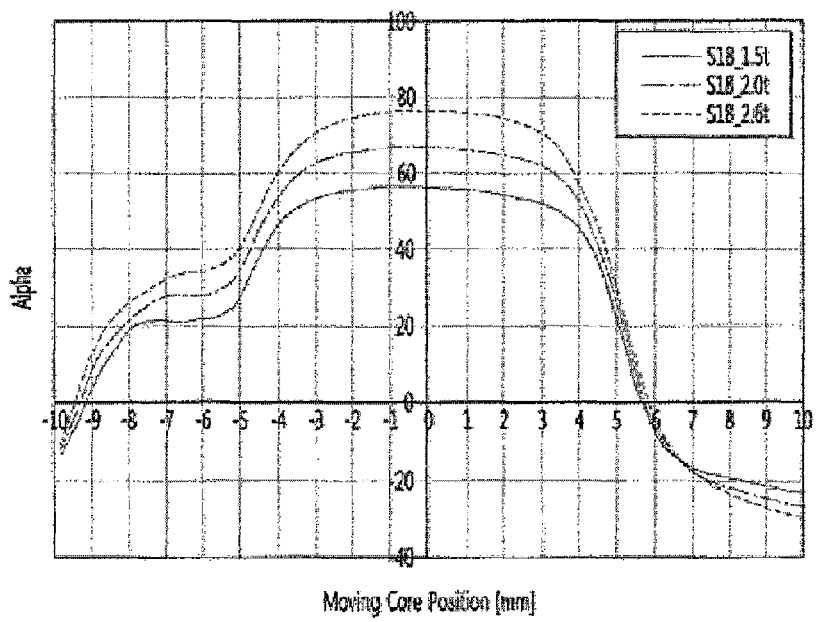
FIG. 10 is a graph showing an operation frequency change according to thickness of a mover.
Figure 11:
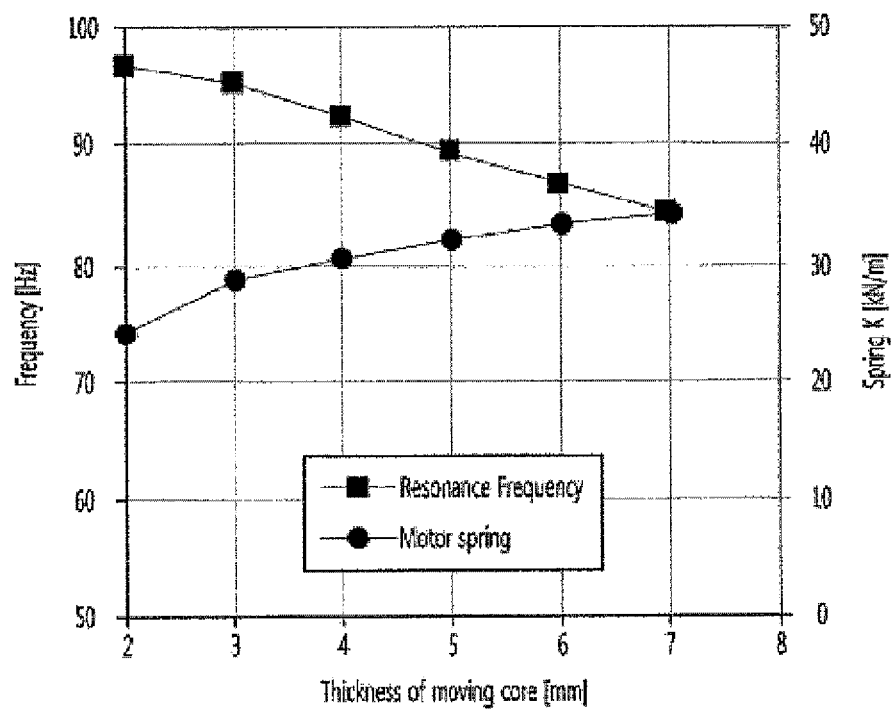
FIG. 11 is a graph showing a change in operation frequency and spring constant according to thickness of a mover.

FIG. 9 is a graph showing an output change according to thickness of a mover. FIG. 10 is a graph showing a change in operation frequency according to thickness of a mover. FIG. 11 is a graph showing a change in operating frequency and spring constant according to thickness of a mover.

First, referring to FIGS. 9 to 11, as the thickness T1 of the movable core increases, the output (force) of the motor increases, it may be confirmed that the operation frequency is decreased due to the increase of the weight of the mover 400. Therefore, it is necessary to determine the thickness of the mover 400 (that is, the movable core) within a range in which a spring stiffness (Spring K) and an alpha value of the spring are not greatly reduced. As a result, when centering is performed to match the centers of the magnet 300 and the mover 400 (that is, the movable core), it is derived that that the thickness T1 of the mover (that is, the movable core) may be less than half of the length L3 that one side magnet pole of the magnet 300 and the mover 400 (that is, the movable core) overlap. The alpha value means an average alpha value (V/m/s) in an operation range.

Figure 12:
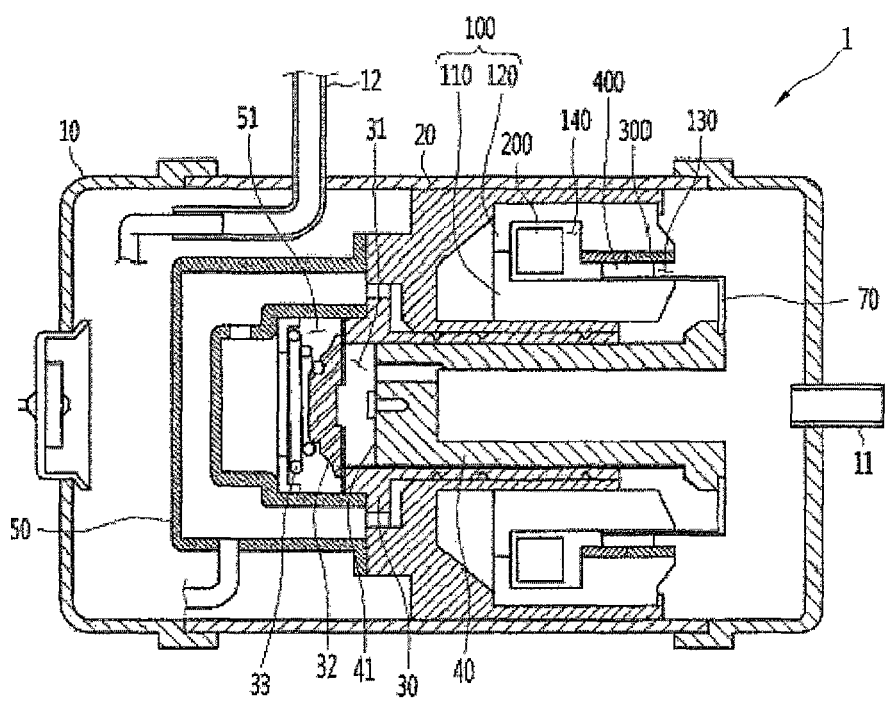
FIG. 12 is a longitudinal sectional view of a reciprocating compressor including a movable core-type reciprocating motor according to an embodiment.

FIG. 12 is a longitudinal sectional view of a reciprocating compressor including a movable core-type reciprocating motor according to an embodiment. Referring to FIG. 12, a reciprocating compressor 1 may include a case 10 having an inner space, a reciprocating motor disposed in the inner space, where a mover 400 performs a reciprocation movement, a piston 40 coupled to the mover 400 of the reciprocating motor to perform a reciprocation movement together with the mover 400, a cylinder 30 into which the piston 40 is inserted to form a compression space, a suction valve 42 configured to open and close a suction side of the compression space, and a discharge valve 32 configured to open and close a discharge side of the compression space.

That is, a suction pipe 11 may be connected to the inner space of the sealed case 10, and one or a first side of the suction pipe 11 may be connected to a discharge pipe 12 that guides a refrigerant, which is compressed in the compression space 31 of the cylinder 30, which is described hereinafter, to a refrigeration cycle. As a result, the inner space of the case 10 may be filled with a suctioned refrigerant to form a suction pressure, and the refrigerant discharged from the compression space 31 may be discharged directly to the outside of the case 10 through the discharge pipe 12 toward a condenser. A frame 20 may be installed in the inner space of the case 10, and the reciprocating motor that generates a reciprocating force and induces a resonance motion of the piston 40, which is described hereinafter, at a same time may be fixedly coupled to one side surface of the frame 20.

The compression space 31 may be provided on an inside of the reciprocating motor to be coupled to the cylinder 30 inserted in the frame 20, and the piston 40 reciprocably inserted into the cylinder 30 to change a volume of the compression space 31, and thus, to compress the refrigerant may be coupled to the cylinder 30. A suction valve 41 that opens and closes a suction passage of the piston 40 may be coupled to a front section of the piston 40 and a discharge valve 32 that opens and closes the compression space 31 of the cylinder 30 may be accommodated in a discharge cover 50 and detachably coupled to the front section of the cylinder 30.

The discharge cover 50 may be fixedly coupled to the cylinder 30 with the discharge space 51 provided therein. The discharge valve 32 and a valve spring 33 that supports the discharge valve 32 may be accommodated in the discharge space 51 of the discharge cover 50, and an inlet of a gas bearing for providing lubrication between the cylinder 30 and the piston 40 may be accommodated. The gas bearing (not shown) may include a gas communication path formed between an inner circumferential surface of the frame 20 and an outer circumferential surface of the cylinder 30, and a plurality of fine gas holes that penetrates from a middle of the gas communication path to the inner circumferential surface of the cylinder 30.

As the reciprocating motor may be formed to have a same configuration as that of FIGS. 1 to 12 described above, this will refer to the reciprocating motor described above. However, in this embodiment, inner stator 110 and outer stator 120 are fixed to the frame 20, and mover 400 is connected to the piston 40 through the connection part 70. Accordingly, when the mover 400 performs a reciprocation movement with respect to the stator 100 and the magnet 300, the piston 40 inserted into the cylinder 30 may perform a reciprocation movement with the mover 400.

In the reciprocating compressor according to this embodiment, when an AC current is applied to the magnet coil 200 of the reciprocating motor, an alternating flux is formed between the stator 100 and the magnet 300 and the mover 400, and in the direction in which the flux by the magnet coil 200 and the flux by the magnet 300 are increased, the mover 400 and the piston 40 connected thereto are continuously moved to perform a reciprocation movement. A reciprocating centering force to restore in a direction in which the magnetic energy is low may be accumulated between the mover 400 and the stator 100 of the reciprocating motor and the magnet 300.

In this state, when the direction of the current applied to the magnet coil 200 is changed, the mover 400 and the piston 40 connected thereto move in opposite directions due to the accumulated reciprocating centering force and the magnetic force by fluxes of the magnet coil 200 and the magnet 300, and a reciprocating centering force to restore in the direction in which the magnetic energy is low is accumulated between the mover 400 and the stator 100 of the reciprocating motor and the magnet 300. In this way, the mover 400 and the piston 40 continuously repeat a reciprocation movement that moves alternately between right and left sides of the drawing, such as in a mechanical resonance spring.

While the mover 400 performs a reciprocation movement in the reciprocating motor, a magnetic resonance spring is formed between the mover 400 and the stator 100 and the magnet 300, thereby inducing the resonance movement of the mover 400 and the piston 40. Therefore, the piston 40 may compress the refrigerant while overcoming the gas force generated in the compression space 31.

The reciprocating compressor according to this embodiment has the action effect according to the reciprocating motor of FIGS. 1 to 11 described above. Therefore, this refers to the reciprocating motor described above.

The reciprocating compressor of this embodiment may include a reciprocating motor which is reduced in size and weight so that it may be made compact and light in weight. Therefore, installation of the compressor may be easy, and maintenance and repair also advantageous.

The aforementioned embodiments may be implemented by applying a linear motor having a single air gap as one end of an outer stator and one end of an inner stator in an axial direction on the basis of a coil are connected to each other. However, the aforementioned embodiments may be also implemented by applying a linear motor having two or more air gaps as two ends of an outer stator and two ends of an inner stator in an axial direction on the basis of a coil are separated from each other, each air gap provided with a magnet. In this case, the basic configuration and effects are the same as those of the aforementioned embodiments. Therefore, detailed descriptions thereof will be omitted.

Therefore, embodiments disclosed herein provide a reciprocating motor which may use all the resonance frequencies within an operation frequency. Embodiments disclosed herein also provide a reciprocating motor capable of miniaturizing a size of the motor in the axial direction.

Embodiments disclosed herein further provide a reciprocating motor capable of increasing motor efficiency by reducing power consumption through a reduced weight of a mover. Embodiments disclosed herein provide a reciprocating motor capable of increasing motor output by increasing a magnitude of the magnet while maintaining the size of the mover.

Embodiments disclosed herein provide a reciprocating motor in which a length of the mover is reduced and a magnetic air gap due to a tolerance is kept minimally. Embodiments disclosed herein provide a reciprocating motor for reducing manufacturing costs with an easily manufactured stator and mover. Embodiments disclosed herein also provide a miniaturized and light reciprocating compressor with the reduced size of a reciprocating motor.

Embodiments disclosed herein provide a movable core-type reciprocating motor that may include a stator including an inner stator and an outer stator, wherein one or first sides of or in an axial direction of the inner stator and the outer stator are connected to each other and the other or second sides of or in the axial direction are spaced from each other to form an air gap; a magnet coil disposed between the inner stator and the outer stator; a magnet fixed to at least one of the inner stator or the outer stator so as to be at least partially positioned within a range of the air gap; and a mover including a movable core disposed in the air gap and made of a magnetic material to perform a reciprocation movement with respect to the stator. Motor efficiency may be increased by reducing power consumption through the reduced weight of the mover.

In addition, a length of the magnet may be at least two times a maximum stroke of the mover. Therefore, a reciprocation movement of the mover may be stably performed within the range.

Also, a length of the mover may be equal to or larger than half of the length of the magnet. Accordingly, linearity and operation range of a motor spring stiffness may be secured.

A thickness of the mover may be less than half of a length that one side magnet pole of the magnet and the mover overlap when the mover is centered. Accordingly, it is possible to secure a required spring constant value while securing an operation frequency of the magnetic spring.

Embodiments disclosed herein provide an reciprocating compressor that may include a case having an inner space; a reciprocating motor is an inner space of the case, where a mover performs a reciprocation movement; a piston coupled to the reciprocating motor to perform a reciprocation movement together; a cylinder into which the piston is inserted to form a compression space; a suction valve configured to open and close a suction side of the compression space; and a discharge valve constructed to open and close to a discharge side of the compression space. The reciprocating motor may include the movable core-type reciprocating motor. The reciprocating compressor may also be made smaller and lighter.

According to embodiments disclosed herein, by resonating the mover with the magnetic resonance spring, it is possible to prevent the use frequency from being limited within the operation frequency of a certain section, so that the efficiency of the motor may be improved. Further, according to embodiments disclosed herein, by resonating the mover with the magnetic resonance spring, it is possible to reduce the number of parts or component for resonating the mover and further reduce a lateral length of the motor.

According to embodiments disclosed herein, by resonating the mover with the magnetic resonance spring, it is possible to prevent the mover from being eccentric due to a lateral force of the resonance spring, thereby reducing friction loss and noise. Moreover, according to embodiments disclosed herein, a weight of the mover may be reduced by coupling the magnet to the end of the stator, and the efficiency of the motor may be improved by reducing power consumption.

According to embodiments disclosed herein, as the reciprocating motor is provided, the reciprocating compressor may be miniaturized and lightweight. That is, according to embodiments disclosed herein, effects such as downsizing of the motor, efficiency improvement of the motor, weight reduction of the motor, and noise reduction of the motor may be obtained. Further, it is apparent that various effects understood by respective constitutions shown in may be obtained.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A movable core-type reciprocating motor, comprising:
    a stator comprising an inner stator and an outer stator, wherein first sides in an axial direction of the inner stator and the outer stator are connected to each other, and second sides in the axial direction are spaced from each other to define an air gap between the inner stator and the outer stator;
    a magnet coil disposed between the inner stator and the outer stator and positioned at one side of the air gap in the axial direction, wherein the magnet coil and the air gap face each other along the axial direction;
    magnets fixed to at least one of the inner stator or the outer stator and at least partially positioned within a range of the air gap, the magnets being arranged along the axial direction and having different magnetic poles from each other along the axial direction; and
    a mover comprising a movable core disposed in the air gap and made of a magnetic material to perform a reciprocation movement with respect to the stator,
    wherein the stator defines a reception groove that is recessed from a surface facing the air gap and that receives at least a portion of the magnets, and
    wherein a recess depth of the reception groove is less than a thickness of the magnets such that a first portion of the magnets is received and fixed in the reception groove, and a second portion of the magnets protrudes outside of the reception groove.

2. The motor of claim 1, wherein a length of the movable core in the axial direction is less than or equal to a length of the magnets in the axial direction.

3. The motor of claim 2, wherein at least one of the magnets or the movable core has at least a portion of an axial direction cross section in an arc shape.

4. The motor of claim 1, wherein the magnet coil and the magnets are spaced apart in the axial direction of the mover.

5. The motor of claim 1, wherein the magnet coil and the movable core are spaced apart from each other in the axial direction of the mover so that an air gap between the magnet coil and the movable core varies depending on the reciprocation movement of the mover.

6. The motor of claim 1, wherein a space for the magnet coil is formed between the inner stator and the outer stator, wherein the space is formed at one side of the air gap in the axial direction, and wherein the space and the air gap communicate with each other.

7. The motor of claim 6, wherein the space is formed eccentrically to an opposite side of the movable core from a center of the stator.

8. The motor of claim 1, wherein at least one of the inner stator or the outer stator has a yoke configured to form a magnetic path and a pole that extends from the yoke and configured to form the air gap, and wherein a width of the pole is greater than a width of the yoke.

9. The motor of claim 1, wherein a length of the magnets in the axial direction is at least twice a maximum stroke of the mover.

10. The motor of claim 1, wherein a length of the movable core in the axial direction is not less than half of a length of the magnets.

11. The motor of claim 1, wherein in a state in which a center of the magnets and a center of the movable core are aligned with each other, a thickness of the mover is less than half of a length that one of the magnets and the movable core overlap.

12. A movable core-type reciprocating motor, comprising:
a stator comprising an inner stator and an outer stator, wherein first sides in an axial direction of the inner stator and the outer stator are connected to each other, and second sides in the axial direction are spaced from each other to define an air gap between the inner stator and the outer stator;
a magnet coil disposed between the inner stator and the outer stator;
magnets fixed to at least one of the inner stator or the outer stator and at least partially positioned within the air gap, the magnets being arranged along the axial direction and having different magnetic poles from each other along the axial direction; and
a mover comprising a movable core disposed in the air gap and made of a magnetic material to perform a reciprocation movement with respect to the stator,
wherein a length of the movable core in the axial direction is less than a length of the magnets, but not less than half of the length of the magnets,
wherein the stator defines a reception groove that is recessed from a surface facing the air gap and that receives at least a portion of the magnets, and
wherein a recess depth of the reception groove is less than a thickness of the magnets such that a first portion of the magnets is received and fixed in the reception groove, and a second portion of the magnets protrudes outside of the reception groove.

13. The motor of claim 12, wherein the length of the magnets in the axial direction is at least twice a maximum stroke of the mover.

14. The motor of claim 12, wherein, in a state in which a center of the magnets and a center of the movable core are aligned with each other, a thickness of the mover is less than half of a length that one of the magnets and the movable core overlap.

15. The motor of claim 12, wherein the magnet coil is disposed at one side of the air gap in the axial direction, and the magnet coil and the air gap face each other along the axial direction.

16. A reciprocating compressor, comprising:
a case having an inner space;
a reciprocating motor disposed in an inner space of the case, where a mover performs a reciprocation movement;
a piston coupled to the mover of the reciprocating motor to perform a reciprocation movement together with the mover;
a cylinder into which the piston is inserted to form a compression space;
a suction valve configured to open and close a suction side of the compression space; and
a discharge valve configured to open and close a discharge side of the compression space,
wherein the reciprocating motor comprises:
a stator comprising an inner stator and an outer stator,
a magnet coil disposed between the inner stator and the outer stator,
magnets fixed to at least one of the inner stator or the outer stator and at least partially positioned within an air gap defined between the inner stator and the outer stator, the magnets being arranged along an axial direction of the stator and having different magnetic poles from each other along the axial direction, and
a mover comprising a movable core disposed in the air gap and made of a magnetic material to perform a reciprocation movement with respect to the stator,
wherein the stator defines a reception groove that is recessed from a surface facing the air gap and that receives at least a portion of the magnets, and
wherein a recess depth of the reception groove is less than a thickness of the magnets such that a first portion of the magnets is received and fixed in the reception groove, and a second portion of the magnets protrudes outside of the reception groove.

17. The compressor of claim 16, wherein first sides in the axial direction of the inner stator and the outer stator are connected to each other, and second sides in the axial direction are spaced from each other to define the air gap between the inner stator and the outer stator.

18. The compressor of claim 17, wherein the magnet coil is disposed at one side of the air gap in the axial direction, and the magnet coil and the air gap face each other along the axial direction.

19. The compressor of claim 17, wherein the stator further defines a winding groove that receives the magnet coil between the inner stator and the outer stator and that is arranged at one side of the air gap in the axial direction, and
wherein a portion of the winding groove and the air gap are in communication with each other along the axial direction.

20. The compressor of claim 16, wherein, in a state in which a center of the magnets and a center of the movable core are aligned with each other, a thickness of the mover is less than half of a length that one of the magnets and the movable core overlap.

* * * * *